United States Patent
Bennett

(10) Patent No.: US 6,782,010 B2
(45) Date of Patent: Aug. 24, 2004

(54) LIMITER OPTICS

(75) Inventor: Harold E. Bennett, Ridgecrest, CA (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 549 days.

(21) Appl. No.: 09/769,111

(22) Filed: Jan. 25, 2001

(65) Prior Publication Data
US 2002/0044573 A1 Apr. 18, 2002

Related U.S. Application Data
(60) Provisional application No. 60/178,531, filed on Jan. 25, 2000.

(51) Int. Cl.[7] ................................................. H01S 3/00
(52) U.S. Cl. ............................................ 372/2; 372/81
(58) Field of Search ............................................. 372/2

(56) References Cited

U.S. PATENT DOCUMENTS

| | | | |
|---|---|---|---|
| 4,479,218 A | * | 10/1984 | Brau et al. ...................... 372/2 |
| 4,491,948 A | * | 1/1985 | Deacon et al. .................. 372/2 |
| 4,748,629 A | | 5/1988 | Edlin et al. |
| 4,999,839 A | | 3/1991 | Deacon |
| 5,029,172 A | | 7/1991 | Edighoffer |
| 5,263,043 A | | 11/1993 | Walsh |
| 5,557,347 A | | 9/1996 | Johnson |
| 5,960,013 A | | 9/1999 | Sheffield |
| 6,285,690 B1 | * | 9/2001 | Kim et al. ...................... 372/2 |

* cited by examiner

Primary Examiner—Don Wong
Assistant Examiner—Dung T Nguyen
(74) Attorney, Agent, or Firm—Kenneth G. Pritchard

(57) ABSTRACT

Limiter optics for an ignition feedback regenerative free electron laser amplifier have a pickoff mirror direct a portion of the output from the free electron laser through a focusing assembler. After expanding this pickoff beam spatially and temporally, the focusing assembler first focuses the expanded pickoff beam to a focal point, the expanded focused pickoff beam is then passed through a movable limiter plate which serves as an off switch if the pickoff beam is above a predetermined intensity and then refocuses the expanded pickoff beam back into the free electron laser to enhance the emission intensity of the output beam. The expanded mirror may be a half silvered mirror or a phased mirror with a plurality of mesas. The pickoff mirror may be convex. The half silvered mirror produces two segments in the pickoff beam with a time lag dependent on the thickness of the mirror. The phased mirror creates a plurality of parallel beams for the expander beam with a predetermined time lag for each of said paralleled beams created. Orientation of a phased mirror may be rotated to control spatial separation of parallel beams.

16 Claims, 6 Drawing Sheets

LIMITER OPTICS

RELATED APPLICATIONS

The benefit of U.S. Provisional Application Serial No. 60/178,531, filed Jan. 25, 2000 is claimed.

BACKGROUND OF THE INVENTION

1. Field of the Invention

The invention relates in general to the control of high-powered lasers, and, in particular, to improving the reliability, safety and power output of free electron lasers.

2. Description of the Prior Art

Manmade space satellites are limited by their power requirements. Solar panels have long been used to provide power for satellites. Solar panels are limited for two reasons. First the energy received from the sun is relatively diffuse and is not adjustable. For a fixed surface area the power that can be created by the solar panel is limited. The greater the power, the larger the surface area required. Mirrors have been used in space to reflect more sunlight on a fixed area. This leads to the second limitation, the mass and volume of the solar panel needed to generate the required power level. For high power levels the mass and volume can force reductions in the remaining portions of the satellite. Even the use of mirrors reduces the mass and volume available for launch payloads. The power limitations force most satellites to be designed to operate on the power requirements of a small household appliance.

Electrical power has always been a limiting factor for satellites, and it restricts the services that they can perform. The need for additional transponders to satisfy the demand for satellite-supplied television, e-mail, worldwide web, long distance telephones, rapid computer data transfer, and many other types of telecommunication is increasing. The number of transponders has risen from about 24 active transponders per satellite in the late 1980's to 94 active transponders on the Hughes satellite launched in late 1997. The demand for additional power over the last few years fits an exponential curve and the end is not in sight. Instead it is increasing even faster. In response to the need for additional frequencies to carry the load the Federal Communications Commission has opened up the Ka band for satellite use. Recently completed National Aeronautics and Space Administration (NASA) studies indicate that the Ka band will on occasion require the availability of up to ten times the power requirements of the lower frequency L, C and Ku bands to counter rain fade.

The additional power needed for the Ka band is required to keep the television signals broadcast to earth at an acceptable level of quality. The Ka frequency band is 26.5 to 40 gigahertz (wavelength range of 11 millimeters to 7 millimeters). The size of raindrops is typically 1 to 3 millimeters with a maximum of 5 to 7 millimeters. Although the Ka band is in a water absorption region, much of the extinction of the signal is caused by the resonance in scattered energy resulting from the proximity of the wavelength to the raindrop size. The only practical source for the additional power required is additional electricity from the solar panels carried on the satellite.

At present the size of satellite solar panels is awkwardly large. Additional satellites in the same "space slot" can be deployed to increase the total solar panel area, and this is the direction that many satellite companies are going. A major drawback of this approach is that the output signals of the various satellites are not in phase, so interference between satellite transmissions can be a problem. The biggest drawback, however, is that the multiple satellite approach is very expensive.

One way to repower the satellites is laser power beaming, LPB. Laser beams can increase the power level an order of magnitude above that available from the sun. Further, since a laser can be tuned to a narrow frequency range, the efficiency of the solar panels can be maximized by using their optimum generating wavelength. Beaming from the earth's surface requires the laser beam to travel through our planet's atmosphere. For LPB to be effective the atmospheric path must be free of clouds. In addition, the atmosphere can cause various other problems associated with turbulence, scatter, and absorption. Sites with clear, smog-free air minimize the last two problem areas. Turbulence is handled by the use of adaptive optics.

Free electron lasers, FELs, are capable of high power without significant wavefront distortion since the light is generated in a vacuum. An ignition feedback regenerative free electron laser (FEL) amplifier (IFRA FEL) designed by Kim, Zholents and Zolotrev does not need cavity mirrors, a power-limiting feature of most types of lasers. It provides greater output power than prior FELs. By feeding a portion of the output power back through the undulator and a portion to the photocathode emitting electrons, optical power grows without the necessity of cavities. Their invention is disclosed in U.S. pat. application Ser. No. 09/361,675. Other prior art patents for free electron lasers include Sheffield U.S. Pat. No. 5,960,013 and Edighoffer U.S. Pat. No. 5,029,172. One problem with IFRA FEL is that the portion of the beam fed back can grow in power, increasing the output of the laser and going into a runaway situation. A further problem with IFRA FEL is that the generated optical pulse is of the same duration as the electron bunch that emitted the pulse. This causes phasing problems unless the optical feedback loop can be accurately controlled. Any portion of an electron bunch out of phase with the optical pulse is wasted. This invention provides a means for phasing of the feedback loop and a means for control of the internal efficiency within the undulator so positive feedback producing a runaway condition does not occur. This invention provides a method and mechanism to lengthen the duration of the optical pulse fed back to the IFRA FEL.

SUMMARY OF THE INVENTION

Limiter optics for an ignition feedback regenerative free electron laser (FEL) amplifier, IFRA FEL, are made by using a very small pickoff mirror to direct a portion of the IFRA FEL's output beam to a pulse expander mirror. Light reflected from the expander mirror is then passed through focusing optics, which refocuses this pulse expanded light beam to a predetermined location within the undulator of the IFRA. FEL. Since it lengthens the duration of the IFRA FEL laser pulse, the next electron bunch is assured of being completely illuminated by the returned optical pulse.

The focusing optics has two Cassegrainian mirror systems. The first Cassegrainian mirror focuses the parallel light beam incident on a convex pickoff mirror to a focal point. The second Cassegrainian mirror then refocuses the light beam into a nearly parallel beam to a focal point in a predetermined location in the undulator. Mounted near the focal point between the two Cassegrainian mirrors is a movable limiter plate which controls the cutoff intensity of the pickoff beam.

In order to meet the phasing conditions, the optical pulse-length exiting the undulator must be expanded. In this way the optical pulse is not required to exactly match the electron bunch length time-wise. The feedback loop average power is planned in the IFRA FEL to be 4 kilowatt. A cooled mirror can handle over 2 kilowatts per square millimeter of surface area.

DESCRIPTION OF PREFERRED EMBODIMENT

Figure 1:
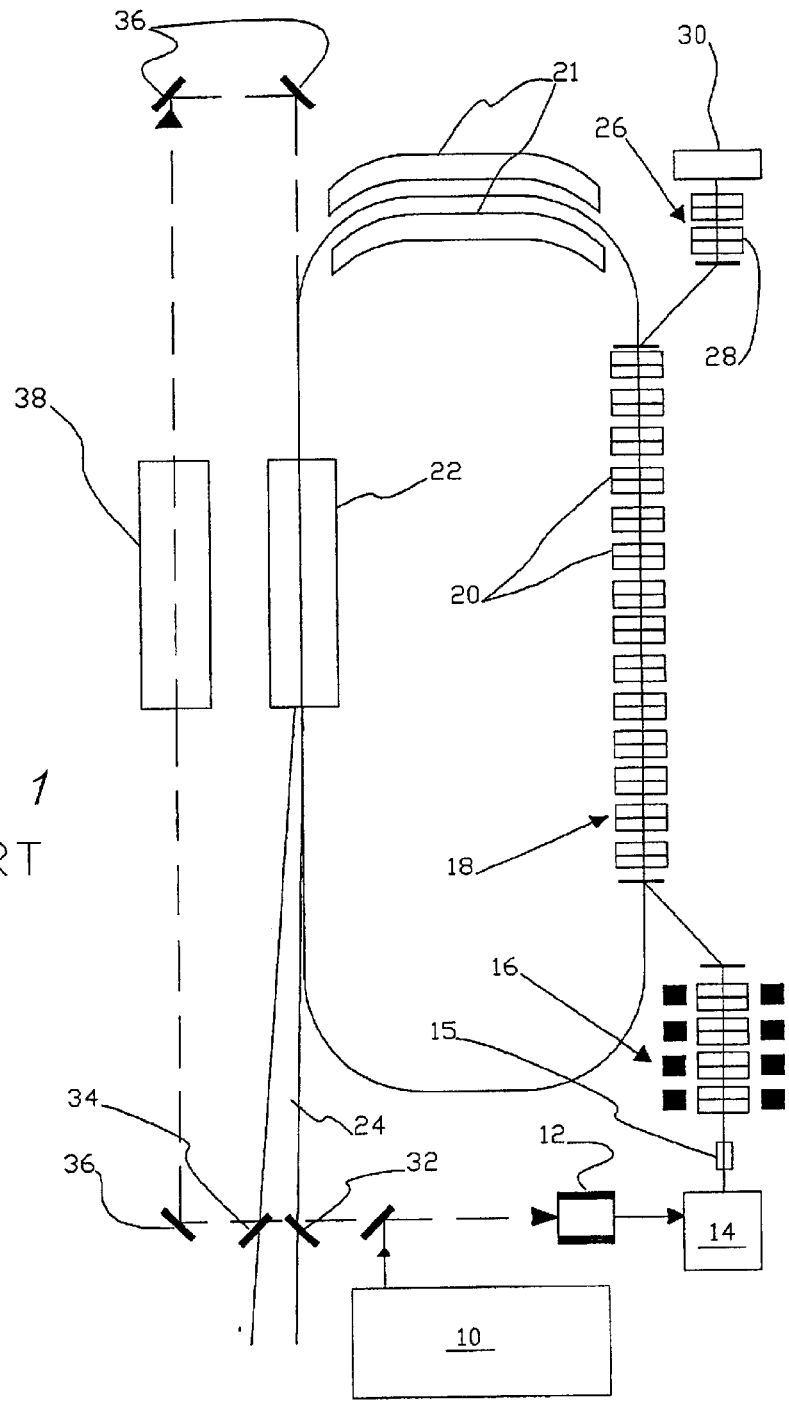
FIG. 1 is a state of the art IFRA FEL.

FIG. 1 is an example of a typical ignition feedback regenerative free electron laser (FEL) amplifier, IFRA FEL, suitable for laser power beaming, LPB. An optical pulse laser 10 has an up-converter 12 take an initial ignition pulse and convert it to a suitable wavelength before it is used to illuminate photocathode 14. Up-converter 12 will not change quality or intensity of light passing through it, but does convert to the best frequency for emission of photons with a given quality and intensity. Photocathode 14 in turn emits a bunch of electrons 15 with a pulse width determined by the design parameters of laser 10 and photocathode 14. This electron bunch is immediately accelerated by an initial accelerator 16. The electron bunch is now directed through a linear accelerator 18, which may have a large number of cooled RF cavities 20 operating near room temperature. Electron bunch 15 is now accelerated by the RF cavities to a speed very close to the speed of light. Electron bunch 15 now enters a bunch compressor 21, which reduces the electron bunch length from about 5 millimeters to about 1 millimeter with a corresponding increase in bunch height. The electron bunch is directed by steering magnets, which may be part of bunch compressor 21, to an undulator 22. Undulator 22 may contain both a linear undulator and a tapered undulator also known as a tapered wiggler. The electron bunch loses about 2 percent of its energy by emitting light, which exits undulator 22 as optical pulse 24. Electron, bunch 15 is directed back into linear accelerator 18 out of phase with RF cavities 20. The bunch decelerates, giving up its energy to the RF cavities 20. Electron bunch 15 is then directed to a beam dump system 26, which is comprised of a further decelerator 28 to avoid radiation hazards and a beam dump 30.

Two pickoff mirrors 32 and 34 are placed in the path of optical pulse 24. Pickoff mirror 32 feeds a portion of optical pulse 24, approximately 5 percent, back through up-converter 12 onto photocathode 14 to generate a new electron bunch. As the energy level of optical pulse 24 increases, the feedback to photocathode 14 increases and in turn this increases the energy level of the electron bunch emitted by the photocathode to a level higher than the initial electron bunch 15. The speed at which the system operates means the output of undulator 22 may be described as a pulsed optical beam. Sample functioning levels can have pulse lengths of approximately 24 picoseconds separated by 8.4 nanoseconds.

Pickoff mirror 34 feeds a second portion, approximately 2 percent, of each optical pulse 24 via mirrors 36 back into undulator 22. If this feedback is timed to coincide with a new electron bunch, illumination by the optical pulse induces in-phase stimulated emission from the electron bunch, increasing the amount of light emitted from the electron bunch in undulator 22. As this cycle repeats, pickoff mirror 34 continually sends back greater optical power, which in turn increases the optical power output from undulator 22. That is more than 2 percent of the energy is given up by the electron bunch because of the presence of the feedback light. If the feedback is unchecked, far more than 2 percent of the energy in the electron bunch will be emitted. Levels that will destroy the system can be reached very quickly, thus the concern over a runaway effect. The IFRA FEL has output increased by the effects of both pickoff beams.

The problems with the prior art of FIG. 1 are (1) to phase the reentrant optical pulse 24 to the new electron bunch entering undulator 22 and (2) to prevent a runaway situation. To avoid problem (2), a mode filter, also known as a limiter plate 38, has been placed in the feedback loop from pickoff mirror 34 to function as an automatic cutoff.

The bunch width of the electron bunches is of the order of 24 picoseconds. The optical pulses are also of this same 24 picoseconds width. To solve problem (1) matching the electron bunch and the optical pulse so they pass through undulator 22 together is critical. To complicate matters the feedback loop can develop divergence problems, especially after passing through a limiter plate.

Figure 2:
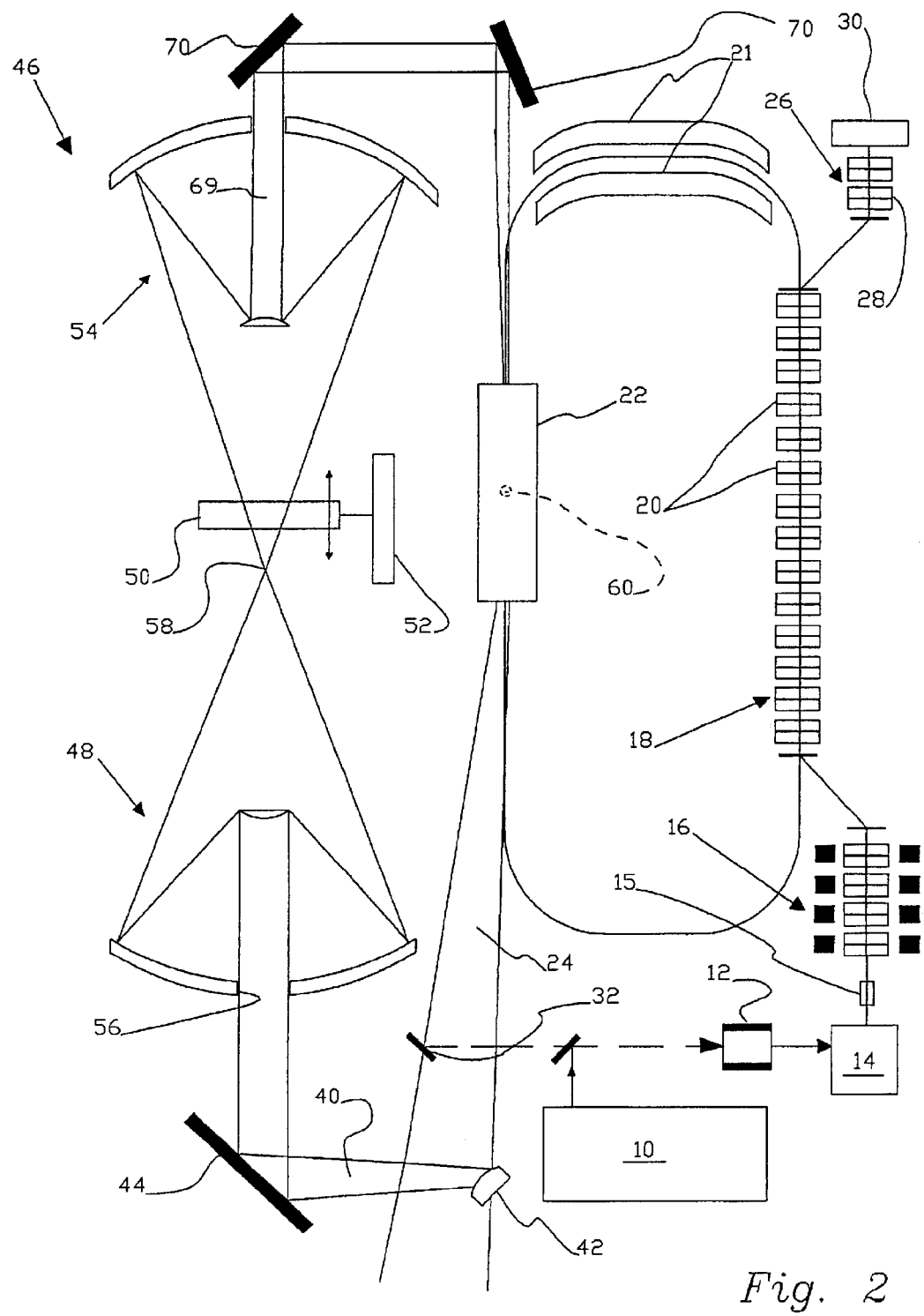
FIG. 2 is a drawing of one embodiment of the present invention.

FIG. 2 is one embodiment of the present invention. Light excited in undulator 22 is parallel, very coherent, and thus can be thought of as originating from a point source. About 2 percent of it is picked off by a pickoff means such as small (possibly as small as 2 millimeters on a side) convex mirror 42. Convex mirror 42 may be cooled by any known cooling techniques for mirrors. These techniques are well known and not shown. The portion picked off, beam 40 expands and strikes a pulse-expander-folding mirror 44. Expander mirror 44 is mounted at the entrance pupil of two focusing optics 48 and 54. Expander mirror 44 is designed to expand the pulse width by a desired factor, two is practical, so that when the returned pulse arrives nearly in phase with the incoming pulse from accelerator 18 the return pulse is twice as wide as the incoming pulse. As a result, even if there is a small phasing error, each point on the incoming pulse is covered by part of the returned pulse and stimulated emission will occur in phase with the emitted light beam. In this way the need for an optical cavity such as that used in most lasers is eliminated. Very high power operation of the laser is then possible since there are no cavity mirrors to damage.

Limiter assembly 46 has expander mirror 44, focusing optics 48, limiter plate 50, adjusting means 52, and refocusing optics 54. The effect of limiter assembly 46 is to tune pickoff beam 40 so it has spatial and temporal uniformity of a preselected pulse duration.

Focusing optics 48 may be a pair of mirrors such as the Cassegrainian arrangement with a central aperture 56 to allow pickoff beam 40 to first be diverged and then refocused to a preselected location, focal point 58. Placed near this location is limiter plate 50 which is mounted on adjusting means 52. Limiter plate 50 is a plate of lead phthalocyanine or one of the azulenic compounds or other similar material which becomes increasingly opaque when the energy density of light passing through exceeds design parameters. Adjusting means 52 may be a vernier drive or other similar means which moves limiter plate 50 either closer to or farther away from focal point 58 of refocused pickoff beam 40. As limiter plate 50 is moved farther from preselected focal point 58, the energy density decreases. As it moves closer, the energy density increases. Thus moving limiter plate 50 functions as an on-off control to prevent a runaway problem.

Further information can be found regarding lead phthalocyanine in "Ultrafast Transient White Light Absorption Spectroscopy of Novel Materials for Optical Limiting", S. M. Kirkpatrick et al. pp 123–127 and further information regarding Azulenic compounds "Optical Power Limiting in Some Azulenic Compounds" B. R. Kimball et al., pp 32–38. Both are in the publication *Power Limiting Materials and Devices*, SPIE Proc v. 3798 July 1999. Other better materials may be used in place of lead phthalocyanine as they become available.

Light that does pass through limiter plate 50 is then refocused again. This time the imaging plane of focal point 58 is refocused to point 60 within undulator 22 of IFRA FEL. The location of point 60 is chosen to maximize the efficiency of stimulated emission. The object is to provide high efficiency for further light emission. By a fundamental theorem in optics every point in a parallel beam from a point source is superimposed on the image of the point source, so temporal mixing of the two different phases of light developed by mirror 42 at focal point 58 is complete and the pulse length of the image formed in the undulator is greater in length than the pulse length beam 24. A plurality of mirrors 70 are placed as desired to direct the refocused beam, exit beam 69, into undulator 22. Mirrors 70 then redirect exit beam 69 to an optimum point 60 in undulator 22. The exact location of point 60 is a matter of design. Ideally, point 60 is near the entrance to undulator 22. Mirrors 70 may be mounted on an optical table, not shown, which may be moved by an adjustment means, also not shown. Commercially available adjustment means include the Inchworm by Burleigh Instruments Inc., or the Nanomover Micropositioner by Melles Griot. Mirrors 70 are shifted along the optical path to assure that exit beam 69 arrives at focal point 60 at the same time as an electron bunch reaches the same point in undulator 22. Focal point 60 may be at any location in undulator 22 desired. This stimulates greater light emission, which in turn leads to a higher intensity pickoff beam 40 for the next cycle. The present invention is designed to prevent any runaway effect.

Figure 3A:
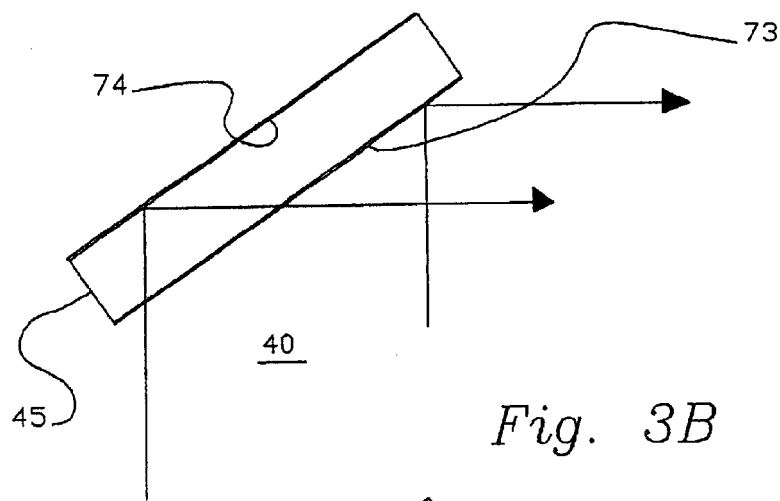
FIGS. 3A, 3B, 3C are views of optically equivalent pulse expander mirrors.
Figure 3B:
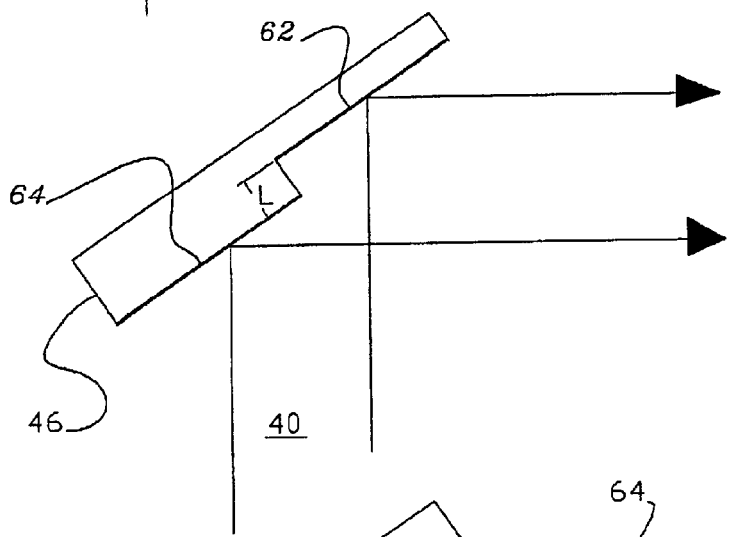
Figure 3C:
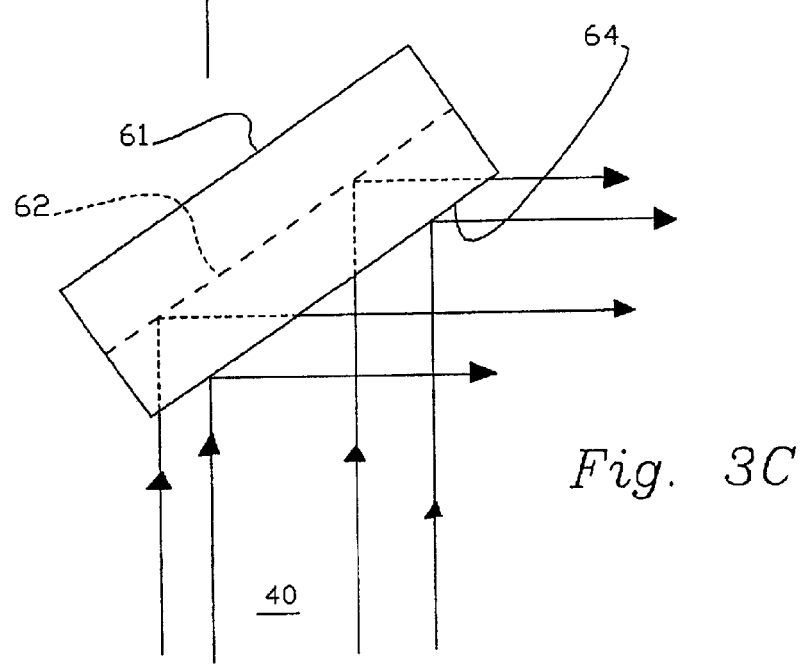

Ideally, a pulse expander-folding mirror would be a single parallel plate about 1–2 millimeters thick as shown in FIG. 3A. In FIG. 3 several mirror variations for use as expander mirror 44 are shown. In FIG. 3A, expander mirror 44 is a half-silvered mirror 45. It is half-silvered so that half of the incident beam 40 is reflected from the first surface 73 and the rest of it from the second surface 74. This is a possible configuration for a pulse expander-folding mirror. However beam 40 is very intense, and it is difficult to cool a glass plate. For a 200 kilowatt laser it will be possible to use, but as the laser output power increases, possibly to a megawatt, it becomes more difficult to cool. Fortunately there are alternatives which are nearly as good as a refractive glass plate. They are mesa-like structures with reflecting surfaces top and bottom, as shown in FIG. 3B and FIG. 3C. The vertical separation between the parallel reflecting surfaces is about 5 millimeters. Since they are mirrors, they can be cooled efficiently by known techniques. The light beams reflected from the top and bottom of the mesa are laterally displaced, but if the beams are focused, they become superimposed and the resulting pulse-length is twice what the incoming pulse length of the electron beam is. The mirror structure is mounted at the entrance pupil of the focusing optics 48, and it focuses the return beam near the entrance of undulator 22, where the electron pulse train and the regenerative optical pulse are combined as discussed above. At that point the doubled pulse width from the reflective optics is optically equivalent to that from the half-silvered mirror. Nearby the overlap is nearly as good, and phase-matched stimulated emission will occur.

Figure 5A:
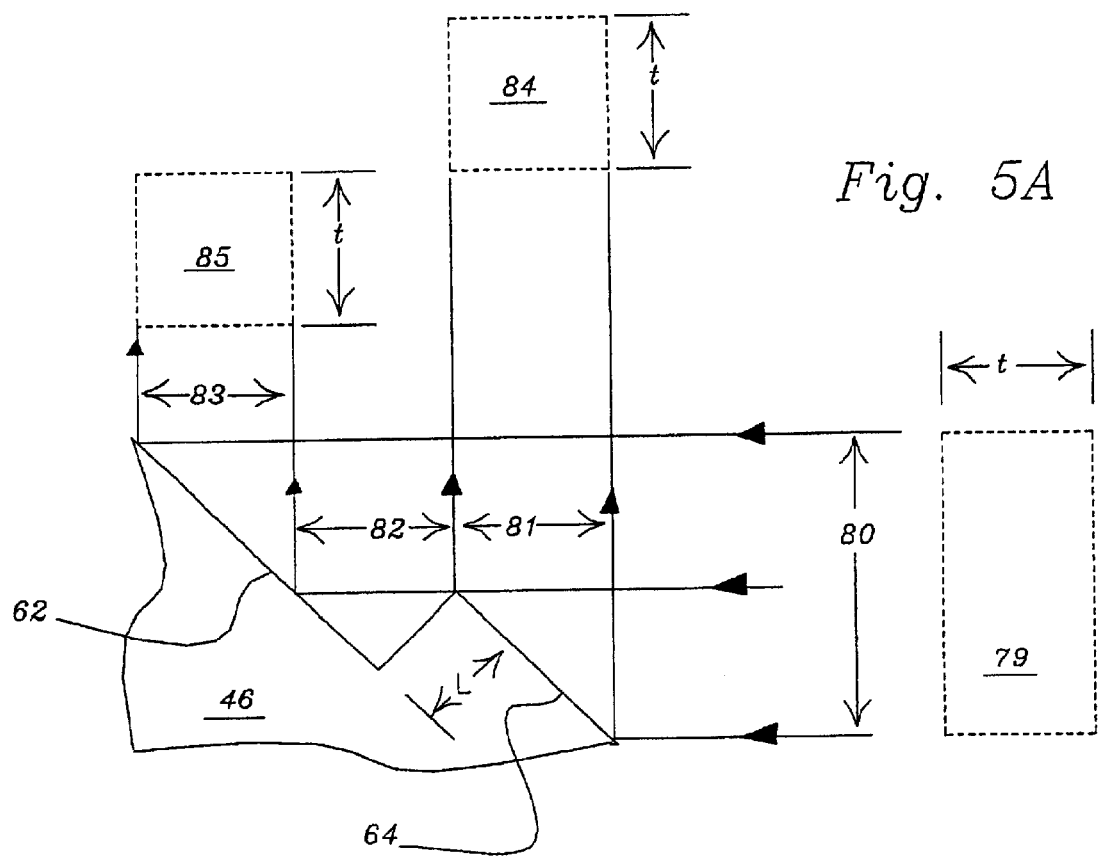
FIG. 5 is a comparison of light reflected from a phased step mirror and from a phased half-silvered mirror.
Figure 6:
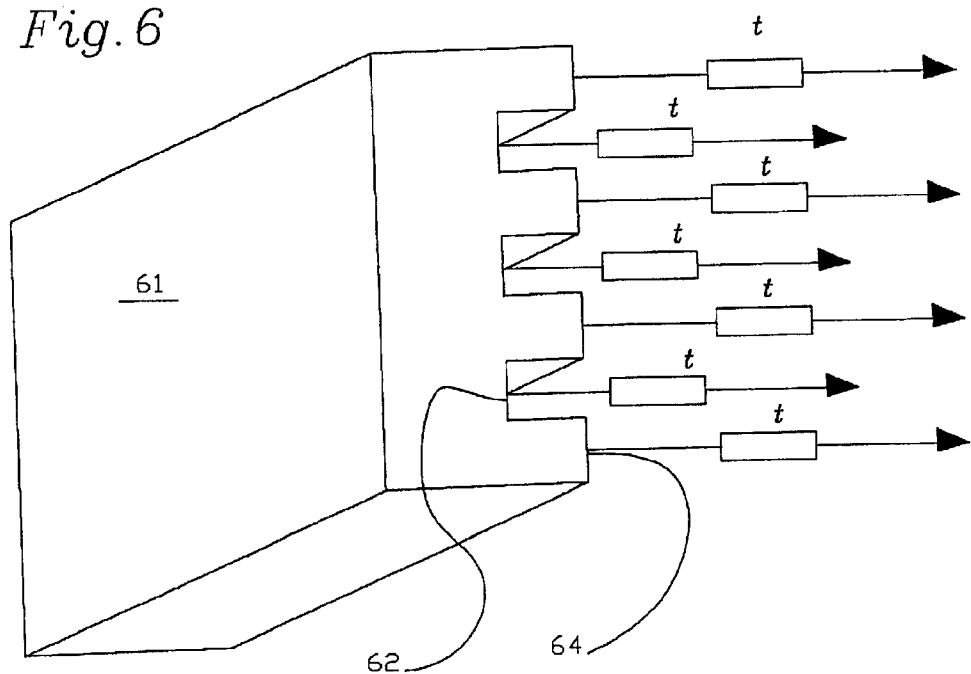
FIG. 6 shows light reflected from a phased mesa mirror for FIG. 3C.

The simplest all-mirror configuration is shown in FIGS. 3B and 5A. The mesa direction may be lined up parallel to the beam direction or rotated 90 degrees as shown. The mesa height L would be about 5 mm. A better system with multiple mesas lying parallel to the beam direction is shown in FIG. 3C and FIG. 6. Since the mesas are closer to each other the effective overlap of the top and bottom of the mesa would extend farther from the focal point of the Cassegrain system than in the case of a single mesa. By orienting the mesas parallel to the beam rather than perpendicular to it vignetting of the beam by the edge of the mesa is eliminated.

FIG. 5A shows a mirror 46 used as the expander mirror 44 with one mesa of depth L. Beam 40 is now shown as a single pulse 79 of pulse length t traveling along optical path 80. Part of pulse 79 reflects off of raised mesa 64 as pulse 84 travels along optical path 81. The rest of pulse 79 reflects off of unraised portion 62 of mirror 46 as pulse 85 travels along optical path 83. By design the portion of pulse 79 reflected from unraised portion 62 is delayed one pulse length t so pulse 79 exits mirror 46 with a double pulse length. With mirror 46 oriented as shown, vignetting occurs due to the gap 82 between optical paths 81 and 83.

The height of mesa 64 may be of any thickness. For FIG. 5A, the thickness L is set at a height so that the leading edge of pulse 85 is timed to match the trailing edge of pulse 84. If step 64 is greater, there will be a time gap after pulse 84 passes before pulse 85 arrives. If step 64 is less, pulses 84 and 85 will partially overlap in time despite being physically offset. Each pulse has a duration time t. For the two pulses to match so the leading edge of pulse 85 matches the trailing edge of pulse 84 the step thickness can be calculated from the relation distance equals velocity times time.

If a phased step mirror 46 is used as in FIG. 5A, then pulse 84 and pulse 85 pass through aperture 56 shown in FIG. 2, each in a different portion of space as well as different time intervals. Pulses 84 and 85 are focused to focal point 58, which becomes the first place where the pulses combine spatially after being separated by mirror 46. By making the plane through focal point 58, the imaging plane for refocusing optics 54, pulses 84 and 85 are brought to the same spatial point 60 solely separated by the time lag caused by phased mirror 46.

Figure 5B:
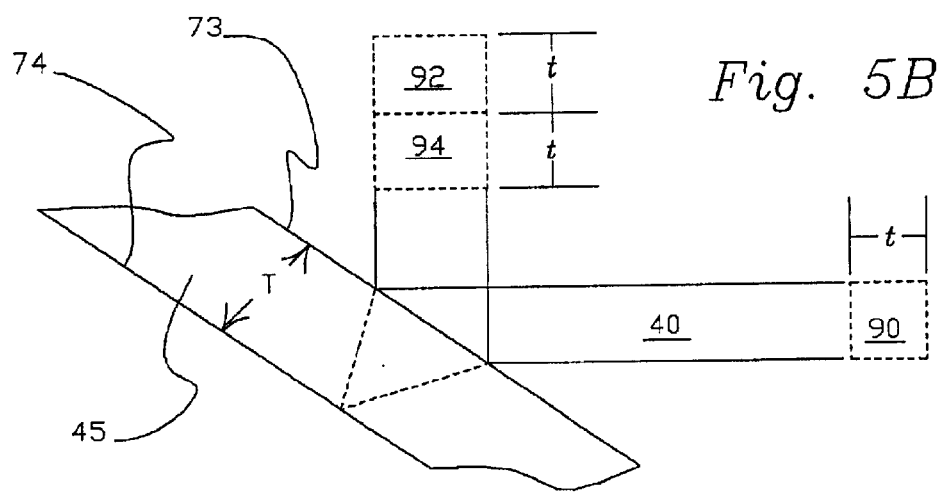

In FIG. 5B, half silvered mirror 45 has front surface 73 and back surface 74 as previously described. Optical pulse 90 of period t, again a parallel coherent light pulse, will have approximately 50 percent of pulse 90 reflected off of front surface 73 and the remainder reflected off of the rear surface 74. Light reflected off of front surface 73 will depart as optical pulse 92. Light reflected off of rear surface 74 will depart as optical pulse 94. Thickness T of half silvered mirror 45 will determine the time lag between the leading edges of pulse 92 and pulse 94. For purposes of example in FIG. 5B, thickness T produces a time lag sufficient to cause the trailing edge of pulse 92 to coincide with the leading edge of pulse 94. Adjusting thickness T can cause a gap between pulses 92 and 94 or cause them to partially overlap.

While this is an alternate embodiment for an expander mirror, it is not the current preferred method because the light reflecting off of back surface 74 does cause internal heating which degrades the mirror performance.

Figure 7:
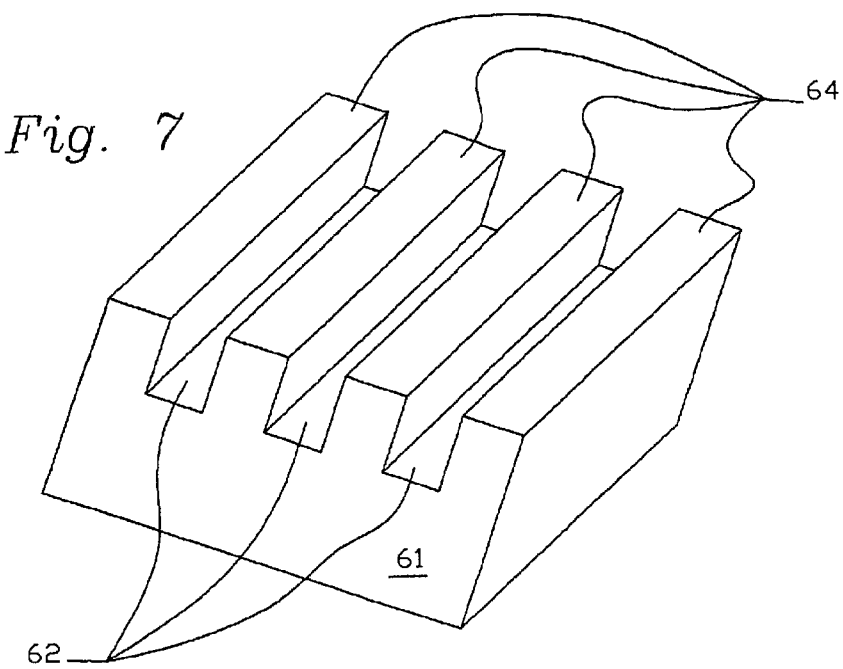
FIG. 7 shows a perspective view of the phased mesa mirror that creates the reflected light pattern of FIG. 6.

If the one step mesa configuration shown in FIGS. 3B and 5A is rotated 90 degrees so it is parallel to beam 40 then the side view would be similar to FIG. 3C except gap 82 is eliminated so vignetting is removed as a possible complication. However, by rotating to be parallel to the beam, a further option is now possible, strips of mesas. FIG. 7 is a perspective of a strip mesa expander mirror 61 suitable for use as expander mirror 44. FIG. 3C is a side view of striped mesa expander mirror 61. Striped mesa expander mirror 61 has reflecting surfaces 62 alternated with raised reflecting surfaces 64. Because all reflecting surfaces 62 and 64 form a single mirror, mirror 61 may be easily cooled by known techniques.

FIG. 6 is an oblique view showing the back and side of mirror 61, in contrast to the side views of FIG. 3 and FIG. 5. Beam 40 is coming from below in FIG. 6. Mirror 61 is angled as shown in FIG. 3C. Beam 40 has pulse t which now is reflected in the delayed pattern shown. Because no gap spatially arise between these optical paths vignetting is avoided. Because there is a layering effect of the expanded pulse components and refocusing problems are reduced because smaller spatial recombination problems are present between adjoining delayed pulse components. Many more varieties for an expander mirror are clearly possible.

Whichever of these options or others is shown for expander mirror 44, mirror 44 is at the focus of focusing optics and serves at a pupil 56. As shown in FIG. 2, focusing optics 48 may be a Cassegrain mirror system. Refocusing optics 54 is also shown as a Cassegrain mirror system. Since mirror 44 is at the focal point of focusing optics 48, refocusing optics 54 will focus this pupil to undulator 22 where the igniter laser pulse and the regenerative pulse are combined. Since focusing optics 48 focuses the pickoff portion of convex mirror 42 onto focal point 58, the beam then expands to fill refocusing optics 54. A spatial filter, not shown, may be placed before focus 58 if desired. Since focus 58 is at the focal point of refocusing optics 54, parallel light beam 69 is emitted by refocusing optics 54, shaped and is sent to pass through undulator 22. Since light from any point on a pupil, here expander mirror 44, passes through every point on any image formed by the optical system, here the parallel beam through undulator 22, lateral phase nonuniformities in the expander mirror 44 caused by the top or bottom reflectors are smoothed out and the stretched pulse from the regenerative loop is laterally uniform.

A major advantage of the stepped mirror configuration is that the possibility of damage to the pickoff system and distortion of the wavefront of the reflected beam is greatly reduced. The laser output of IFRA FEL has an initial power of 200 kilowatts and an ultimate power of a megawatt or more. The diameter of the output beam is approximately one centimeter. It then begins to expand. Approximately 2 percent of the output beam is deflected back into the feedback system by mirror 42. Fully reflective mirrors can be cooled and if properly designed have been shown experimentally to be able to handle over 2 kilowatts per square millimeter of power without mirror distortion. (See R. M. Wood Laser Damage in Optical Materials (Adam Hilger, Bristol, 1986), pp. 113 and 121.)

An additional advantage of the stepped mirror configuration is the absence of transmission through an optical component. Not only does transmission make it difficult to adequately cool the component but defects in the material can cause hot spots which may not only scatter light and deform the transmitted wavefront but may also weaken the material and become a site for catastrophic damage. The thickness of materials used in any mirror may cause scatter as the beam is both reflected and partially transmitted from the front surface of the material and the transmitted portion is then reflected from the back surface of the mirror.

If a phased mirror is used, the amount of separation L is set at a distance needed to produce adjoining pulses of a desired time lag. As an example, if a 24 picosecond pulse is desired, focus the existing beam at the optimum position within undulator 22. Separation L is then about 5 millimeter. The previously described adjustment means, not shown can move the pair of mirrors 70 to adjust the phase of the pulse.

If a half silvered pickoff mirror 45 is used as the pickoff means, the thickness T, as shown in FIG. 5B, will determine the amount of delay the transmitted light through top surface 73 will have after reflecting off of bottom surface 74. Front surface 73 is coated with a semitransparent material that reflects 50 percent or so of the light. The remaining light transmits to back surface 74, which is coated with a fully reflective coating. For incident light at 45° as shown in FIG. 5B, the light is refracted for a given index of refraction. The light then travels a distance in mirror 45, reflects off of the back surface and travels the same distance in mirror 45 before exiting. These paths are shown in dashed lines in FIG. 5B. Light reflecting off of the upper surface at the same location as the exit point for light from the back surface has traveled a different distance. Using the geometric relations shown in FIG. 5B with 34 picosecond pulses and a mirror 45 with an index of refraction of 1.5 1.5 yields a thickness 1.28 millimeters for T. For a stepped mirror as shown in FIG. 5A, the height L of the mesa for similar conditions is 5.09 millimeters. Such half silvered expander mirrors are commercially available.

Figure 4:
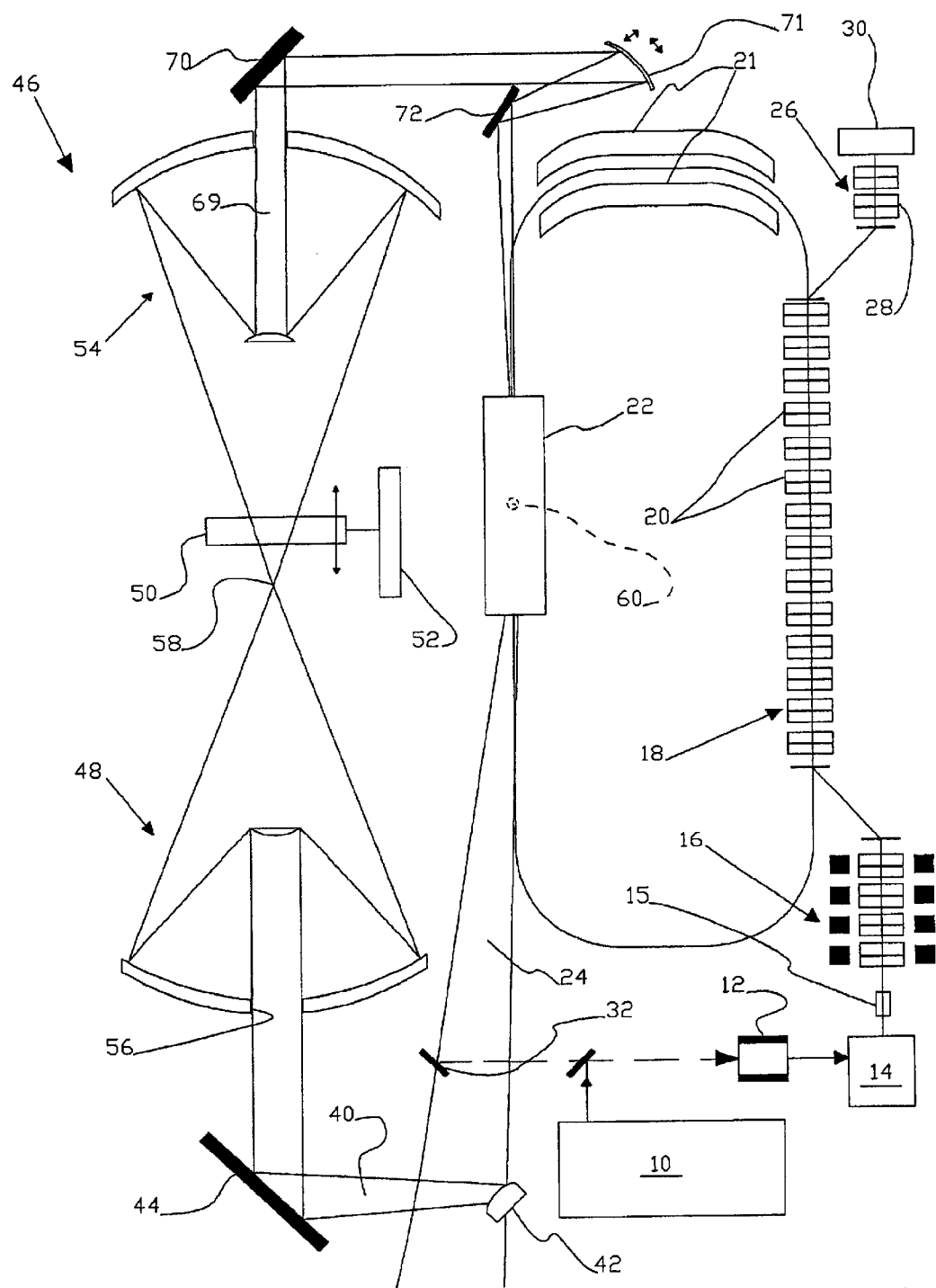
FIG. 4 is an alternate embodiment of the present invention.

FIG. 4 is an alternate embodiment of the present invention. Half silvered mirror 45 is shown as the expander means. Mirror 45 is used to redirect the pickoff beam 40 into focusing optics 48. Refocusing optics 54, which may also be a Cassegrainian arrangement, now produce an exit beam 69. The choice of whether exit beam 69 is a parallel or converging beam is the designer's choice and is not effected by the manner in which the expander beam is created. A plurality of mirrors, here shown as two concave mirrors 71 and 72, bring exit beam 69 to a focus at point 60 as shown before. These mirrors become part of refocusing optics 54 needed to refocus the imagining plane to point 60. There are many other arrangements to refocus the imaging plane through focus point 58 to point 60 in undulator 22. Also, in FIG. 4, mirrors 70, 71, and 72 may be mounted on an optical table not shown which is adjustable in three dimensions along the optical path for the same reasons as discussed above. The adjustment of concave mirror 71 is illustrated by double headed arrows. The other mirrors can be similarly adjusted in three dimensions, if desired.

What is claimed is:

1. Limiter optics for an ignition feedback regenerative free electron laser amplifier having a pulsed output beam of predetermined duration from an undulator comprising:

A. A pickoff member using a convex pickoff mirror adapted to direct a portion of the output of said pulsed output beam as a pickoff beam and which expands said pickoff beam to a predetermined size; and B. a limiter assembly adapted to bring said directed pickoff beam to a focus at a selected point within said undulator at a selected time where said limiter assembly further comprises:
  (i) an expander mirror adapted to modify spatial and temporal characteristics of said portion of the output picked off by said pickoff means;
  (ii) a first focusing optics adapted to focusing said modified directed pickoff beam to a focal point;
  (iii) a limiter plate movably placed near said focal point so as to allow said focused modified directed pickoff beam to pass through said limiter plate;
  (iv) adjusting member operably connected to said limiter plate and adapted to move it closer to or farther from said focal point as desired; and
  (v) a second focusing optics placed after said pickoff beam has passed through said limiter plate and adapted to refocus said focused directed pickoff beam to a predetermined point in said ignition feedback regenerative free electron laser amplifier.

2. Limiter optics as described in claim 1 where said limiter assembly further comprises:
  A. An expander mirror adapted to modifying spatial and temporal characteristics of said portion of the output picked off by said pickoff member;
  B. a first focusing optics adapted to focusing said modified directed pickoff beam to a focal point;
  C. a limiter plate movably placed near said focal point so as to allow said focused modified directed pickoff beam to pass through said limiter plate;
  D. adjusting member operably connected to said limiter plate and adapted to move it closer to or farther from said focal point as desired; and
  E. a second focusing optics placed after said pickoff beam has passed through said limiter plate and adapted to refocus said focused directed pickoff beam to a predetermined point in said ignition feedback regenerative free electron laser amplifier.

3. Limiter optics as described in claim 1 where said expander mirror comprises a half silvered mirror adapted to change the pulse duration of the directed picked off portion of said pulsed output beam by a predetermined amount.

4. Limiter optics as described in claim 2 where said expander mirror comprises a half silvered mirror which is adapted to change the pulse duration of the directed picked off portion of said pulsed output beam by a predetermined amount.

5. Limiter optics as described in claim 1 where said expander mirror comprises a phased mirror having at least one step adapted to increase the pulse duration of the directed picked off portion of said picked output beam.

6. Limiter optics as described in claim 2 where said expander mirror comprises a phased mirror having at least one step adapted to increase the pulse duration of the directed picked off portion of said picked output beam.

7. Limiter optics as described in claim 1 wherein said first focusing optics comprises a Cassegrainian arrangement and said second focusing optics comprises a Cassegrainian arrangement.

8. Limiter optics as described in claim 2 wherein said first focusing optics comprises a Cassegrainian arrangement and said second focusing optics comprises a Cassegrainian arrangement.

9. Limiter optics as described in claim 3 wherein said first focusing optics comprises a Cassegrainian arrangement and said second focusing optics comprises a Cassegrainian arrangement.

10. Limiter optics as described in claim 4 wherein said first focusing optics comprises a Cassegrainian arrangement and said second focusing optics comprises a Cassegrainian arrangement.

11. Limiter optics as described in claim 5 wherein said first focusing optics comprises a Cassegrainian arrangement and said second focusing optics comprises a Cassegrainian arrangement.

12. Limiter optics as described in claim 6 wherein said first focusing optics comprises a Cassegrainian arrangement and said second focusing optics comprises a Cassegrainian arrangement.

13. Limiter optics as described in claim 1 where said expander mirror comprises a phased mirror of striped mesas, said striped mesa being parallel to each other and having a preselected height.

14. Limiter optics as described in claim 2 where said expander mirror comprises a phased mirror of striped mesas, said striped mesa being parallel to each other and having a preselected height.

15. Limiter optics as described in claim 13 further comprising a Cassegrainian arrangement for said first focusing optics and a Cassegrainian arrangement for said second focusing optics.

16. Limiter optics as described in claim 14 further comprising a Cassegrainian arrangement for said first focusing optics and a Cassegrainian arrangement for said second focusing optics.

* * * * *